United States Patent [19]
Yosin et al.

[11] Patent Number: 5,443,223
[45] Date of Patent: Aug. 22, 1995

[54] STRUCTURE FOR USE IN A SEAT BELT RETRACTOR AND METHOD OF USING THE STRUCTURE TO MAKE A SEAT BELT RETRACTOR

[75] Inventors: Dean T. Yosin, Sterling Heights; Larry F. Emmerling, Clio, both of Mich.

[73] Assignee: TRW Vehicle Safety Systems Inc., Lyndhurst, Ohio

[21] Appl. No.: 142,762

[22] Filed: Oct. 26, 1993

[51] Int. Cl.⁶ .............................................. B60R 22/00
[52] U.S. Cl. .................................... 242/379; 264/249; 264/295; 29/438
[58] Field of Search ................. 242/379; 264/249, 273, 264/295; 72/379.2; 29/438, 439, 527.4

[56] References Cited

U.S. PATENT DOCUMENTS

| | | | |
|---|---|---|---|
| 3,023,487 | 3/1962 | Hinckley | 29/438 |
| 3,367,809 | 2/1968 | Soloff | 264/249 |
| 4,204,652 | 5/1980 | Cislak et al. | 242/379 |
| 4,285,478 | 8/1981 | Stamboulian | 242/379 |
| 4,381,086 | 4/1983 | Pfeiffer | 242/379.1 |
| 4,383,803 | 5/1983 | Cachia | 242/379 |
| 4,384,804 | 5/1983 | Cachia et al. | 242/379 |
| 4,549,705 | 10/1985 | Fohl . | |
| 4,620,357 | 11/1986 | Fohl | 29/439 |
| 4,822,671 | 4/1989 | Carper et al. | 264/249 |
| 4,984,752 | 1/1991 | Marrs et al. | 242/379 |

FOREIGN PATENT DOCUMENTS

| | | | |
|---|---|---|---|
| 3203502 | 8/1983 | Germany | 242/379 |
| 3244204 | 5/1984 | Germany | 242/379.1 |
| 3402245 | 7/1985 | Germany | 242/379 |

OTHER PUBLICATIONS

Vectra Liquid Crystal Polymer, An Introduction (VC-3), Hoechst Celanese, Advanced Materials Group.
Vectra Liquid Crystal Polymer, Short Term Properties (VC-4), Hoechst Celanese, Engineering Plastics Division.
Vectra Liquid Crystal Polymer, Molding Guidelines and Specifications (VC-6), Hoechst Celanese, Advanced Materials Group.

Primary Examiner—John P. Darling
Attorney, Agent, or Firm—Tarolli, Sundheim & Covell

[57] ABSTRACT

A structure (10) is provided for use in a seat belt retractor (11) having a frame (13), a spool (15) supported in the frame and rotatable in belt winding and unwinding directions, a spring member (75) biasing the spool in the belt winding direction, and a spring cover (26) attachable to the frame for enclosing the spring member. The structure includes a first plastic portion (22) which is at least a part of the frame (13) of the retractor (11). The structure also includes a second plastic portion (26) which comprises the spring cover. A plastic hinge portion (28) interconnects the first and the second plastic portions (22, 26). The plastic hinge portion (28) enables the first and second plastic portions (22, 26) to pivot relative to each other and into position with the second plastic portion (26) covering the spring member (75).

43 Claims, 3 Drawing Sheets

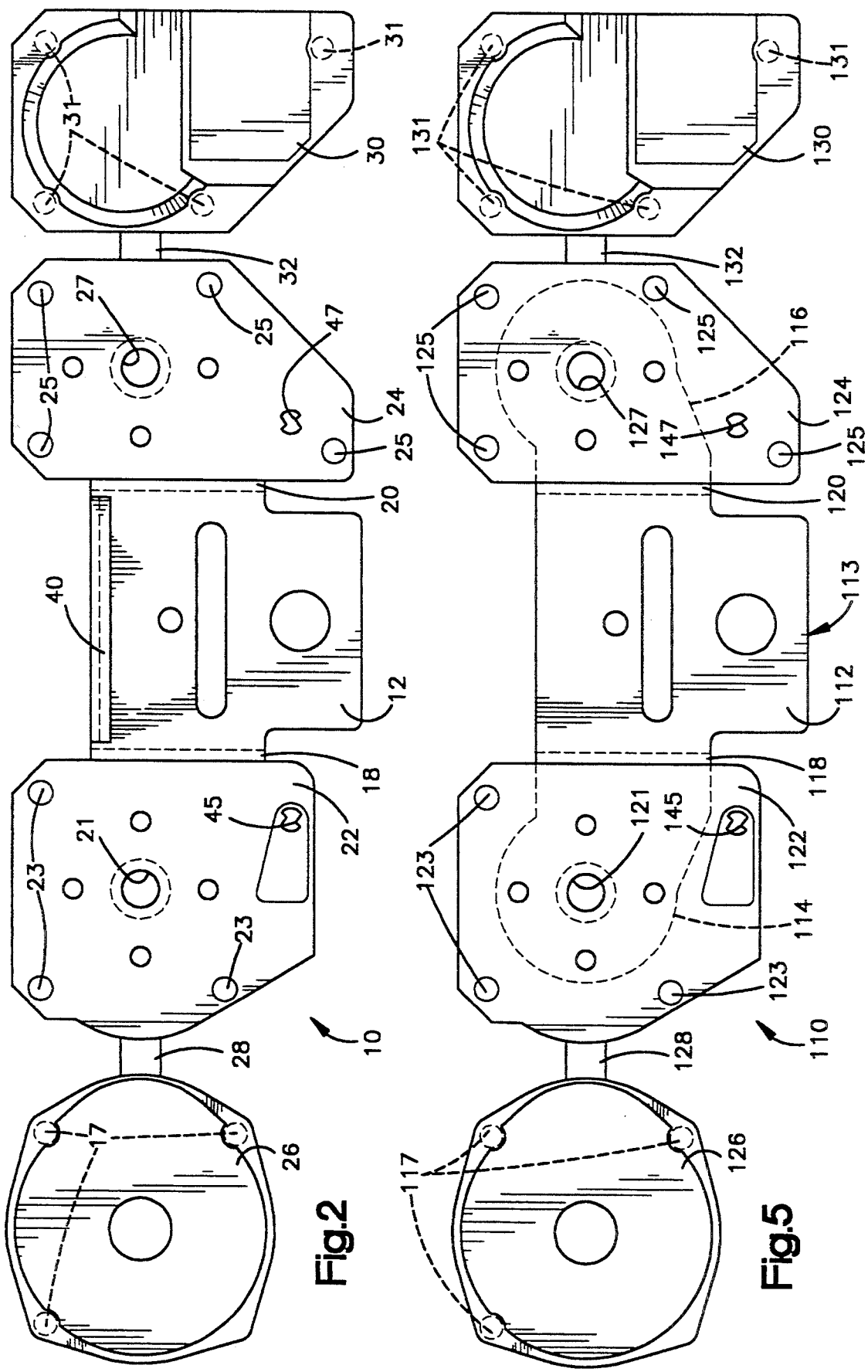

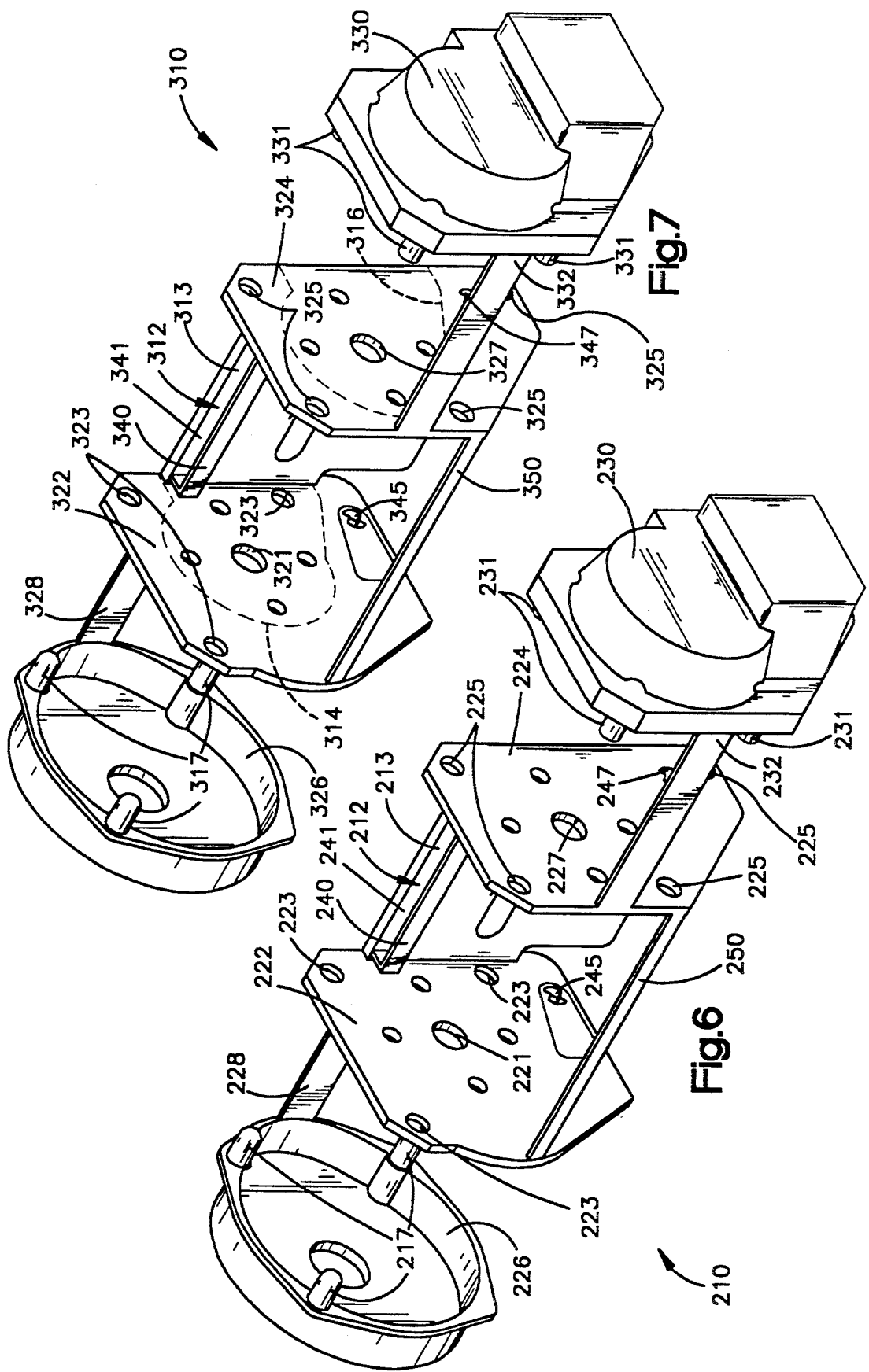

STRUCTURE FOR USE IN A SEAT BELT RETRACTOR AND METHOD OF USING THE STRUCTURE TO MAKE A SEAT BELT RETRACTOR

BACKGROUND OF THE INVENTION

1. Technical Field

The present invention relates to a seat belt retractor and to a method of making a seat belt retractor, and in particular relates to a seat belt retractor and a method of making a seat belt retractor having a frame, a spool supported in the frame for rotation in belt winding and unwinding directions, and a spring biasing the spool in the belt winding direction.

2. Background Art

Many different seat belt retractors are known. Typically, a seat belt retractor includes a generally U-shaped frame and a spool rotatably mounted between the two legs of the U-shaped frame. Belt webbing is wound on the spool. The spool is rotatable in a belt withdrawal direction to pay out belt webbing and in a belt retraction direction to wind belt webbing onto the spool.

A belt webbing guide is fixedly connected to the U-shaped frame. The belt webbing guide and the U-shaped frame define an opening through which the belt webbing extends. A tie bar is sometimes connected between the two legs of the U-shaped frame to provide additional support for the U-shaped frame. A coil spring is located adjacent one leg of the U-shaped frame and is operatively connected to one end of the spool for biasing the spool in the belt retraction direction. A spring cover extends over the coil spring and is fastened to the adjacent leg of the U-shaped frame to cover and protect the coil spring.

A sensor mechanism, such as a vehicle deceleration sensor and/or a webbing acceleration sensor, may be located adjacent the other leg of the U-shaped frame. A vehicle deceleration sensor senses vehicle deceleration of at least a predetermined magnitude. A webbing acceleration sensor senses acceleration of the belt webbing in the belt withdrawal direction of at least a predetermined amount. A sensor cover extends over the sensor mechanism and is fastened to the adjacent leg of the U-shaped frame to cover and protect the sensor mechanism. An actuatable locking pawl arrangement is operatively connected to the spool for, when actuated, preventing rotation of the spool in the belt withdrawal direction. The locking pawl arrangement actuates in response to the sensor sensing vehicle deceleration of at least the predetermined magnitude and/or acceleration of the belt webbing in the belt withdrawal direction of at least a predetermined amount.

The known seat belt retractors have a relatively large number of separate components. When a seat belt retractor has a relatively large number of separate components, the amount of labor required to assemble the seat belt retractor is relatively large, resulting in relatively high manufacturing costs.

SUMMARY OF THE INVENTION

In accordance with the present invention, a seat belt retractor has a frame, a spool supported in the frame and rotatable in belt winding and unwinding directions, a spring member biasing the spool in the belt winding direction, and a sensor member. The seat belt retractor includes a structure which comprises a first plastic portion, which is at least a part of the frame of the retractor, and a second plastic portion, which is a cover for either the spring member or the sensor member. A first plastic hinge portion is made in one piece with and interconnects the first and second plastic portions for enabling the first and second plastic portions to pivot relative to each other. Means on the first and second plastic portions is provided for securing the first and second plastic portions together, with the second plastic portion covering either the spring member or the sensor member.

In a first embodiment of the present invention, the structure includes the first plastic portion, which is a plastic side frame portion, and the second plastic portion, which is a plastic spring cover. The plastic side frame portion is interconnected through a second plastic hinge portion to a plastic base portion. The second plastic hinge portion is made in one piece with the plastic side frame portion and the plastic base portion and enables the plastic side frame portion and the plastic base portion to pivot relative to each other. The plastic side frame portion and the plastic base portion are pivotable into position with the plastic side frame portion and the plastic base portion comprising at least a part of the frame of the retractor.

In a second embodiment of the present invention, the structure includes the first plastic portion, which is a plastic side frame portion, and the second plastic portion, which is a plastic spring cover. A metal base portion is insert molded into the plastic side frame portion. The metal base portion is bendable relative to the plastic side frame portion into position with the metal base portion and the plastic side frame portion comprising at least a part of the frame of the retractor.

In a third embodiment of the present invention, the structure includes the first plastic portion, which is molded as a generally U-shaped piece of plastic material, and the second plastic portion, which is a plastic spring cover hingedly connected to the U-shaped piece of plastic material. The generally U-shaped piece of plastic material comprises the frame of the retractor.

In a fourth embodiment of the present invention, the structure includes the first plastic portion, which is a plastic side frame portion, and the second plastic portion, which is a plastic spring cover. A metal base portion is insert molded at one edge into the plastic side frame portion and at an opposite edge into another plastic side frame portion to form a generally U-shaped molded structure. A plastic tie bar portion is located opposite the metal base portion and interconnects the two plastic side frame portions to provide additional support for the plastic side frame portions. The plastic tie bar portion and the two plastic side frame portions comprise a homogeneous plastic material. The metal base portion, the plastic tie bar portion, and the two plastic side frame portions comprise the frame of the retractor.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a plan view of the structure of the seat belt retractor of FIG. 1;

FIG. 5 is a plan view similar to FIG. 2 and showing a second embodiment of the present invention;

FIG. 6 is a perspective view of certain parts of a seat belt retractor and showing a third embodiment of the present invention; and FIG. 7 is a perspective view similar to FIG. 6 and showing a fourth embodiment of the present invention.

DESCRIPTION OF PREFERRED EMBODIMENTS

Figure 1:
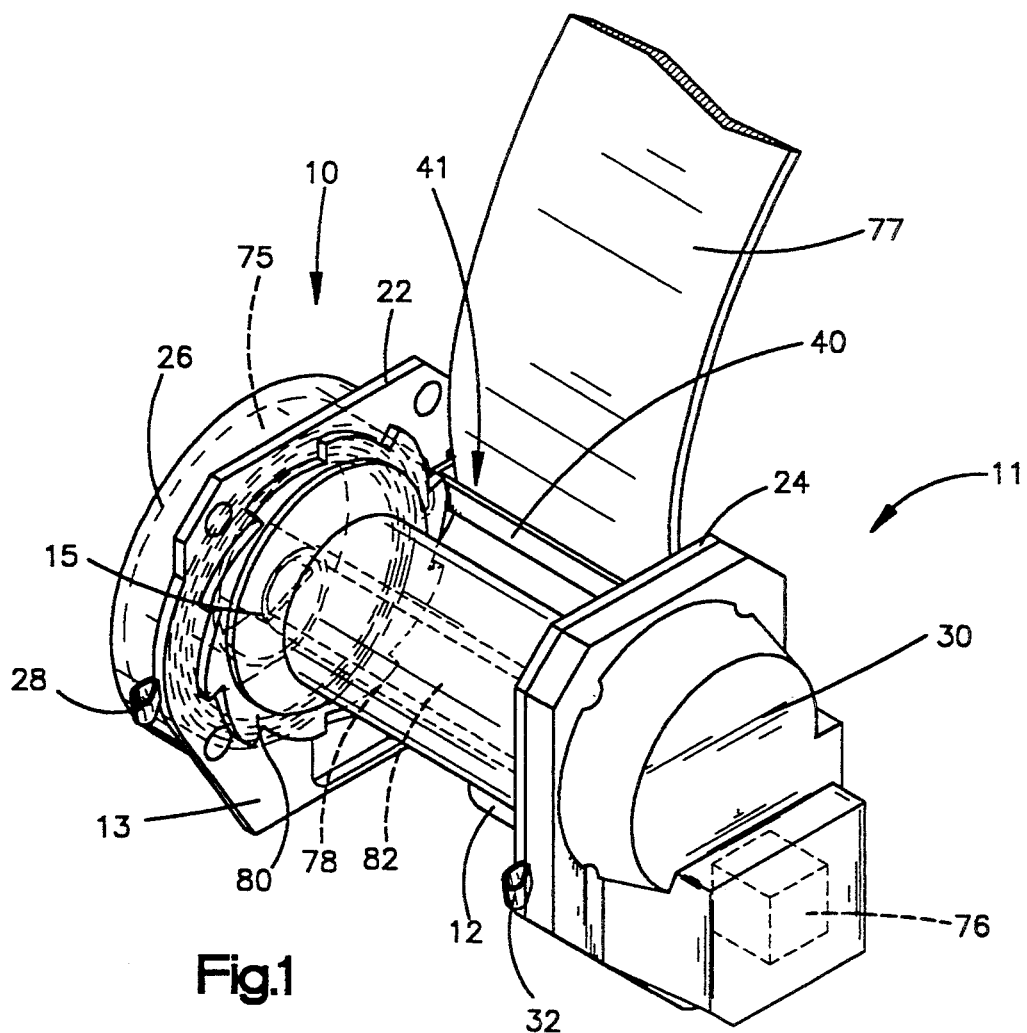
FIG. 1 is a schematic perspective view of an assembled seat belt retractor embodying a structure constructed in accordance with the present invention.

The present invention is directed to a structure 10, as shown in FIG. 2, for use in a seat belt retractor 11, as shown in FIG. 1. The retractor 11 is shown in FIG. 1 in a fully assembled condition. The retractor 11 has a frame 13, a spool 15 supported in the frame 13 and rotatable in belt winding and unwinding directions, a return coil spring 75 (shown in FIG. 1 only) biasing the spool 15 in the belt winding direction, and a spring cover 26 attached to the frame 13 for enclosing the spring 75. A ratchet wheel 80 is fixedly connected with the spool 15 in a manner that is known. The spool 15 has a longitudinally extending bore 82 in which a spool shaft 78 is received. The spool 15 and the spool shaft 78 are interconnected to rotate together. Belt webbing 77 is wound on the spool 15.

Referring to FIG. 2, the structure 10 includes parts which can be processed and formed to comprise at least a part of the frame 13 of the seat belt retractor 11. The structure 10 comprises a plastic base portion 12 and a plastic side frame portion 22 to which the spring cover 26 is attachable to enclose the spring 75. One end of the spool 15 is supported by the plastic side frame portion 22 for rotation in the belt winding and unwinding directions. The side frame portion 22 has three holes 23 which are located in a triangular pattern adjacent three corners of the side frame portion 22. The side frame portion 22 also has a centrally located hole 21 and an opening 45 located adjacent a fourth corner of the side frame portion 22, as shown in FIG. 2. A plastic hinge portion 18 interconnects the base portion 12 and the side frame portion 22 and enables the base portion 12 and the side frame portion 22 to pivot relative to each other.

The structure 10 also comprises a plastic side frame portion 24 on which another end of the spool 15 is supported for rotation in the belt winding and unwinding directions. The side frame portion 24 is located opposite the side frame portion 22. The side frame portion 24 has four holes 25 which are located adjacent four corners of the side frame portion 24. The side frame portion 24 also has a centrally located hole 27 and an opening 47 located near one of the four holes 25, as shown in FIG. 2. The hole 27 in the side frame portion 24 is the same diameter as the hole 21 in the side frame portion 22. The opening 47 in the side frame portion 24 has a shape which is a mirror image of the shape of the opening 45 in the side frame portion 22. A plastic hinge portion 20 interconnects the base portion 12 and the side frame portion 24 in the same way that the hinge portion 18 interconnects the base portion 12 and the side frame portion 22.

The structure 10 further includes a plastic portion 26 comprising the spring cover. A plastic hinge portion 28 interconnects the side frame portion 22 and the spring cover 26. The spring cover 26 includes three pins 17 which project perpendicularly from the spring cover 26, into the page as viewed in FIG. 2.

The structure 10 still further includes a plastic portion 30 comprising a sensor cover for a sensor 76 (shown in FIG. 1 only). A plastic hinge portion 32 interconnects the side frame portion 24 and the sensor cover 30. The sensor cover 30 includes four pins 31 which project perpendicularly from the sensor cover 30, into the page as viewed in FIG. 2. The hinge portion 32 interconnects the side frame portion 24 and the sensor cover 30 in the same way that the hinge portion 28 interconnects the side frame portion 22 and the spring cover 26.

The base portion 12, the two side frame portions 22, 24, the two covers 26, 30, and the four hinge portions 18, 20, 28, 32 comprise a homogeneous plastic material. The homogeneous plastic material is made, for example, of a liquid crystal polymer called "VECTRA" (trademark, Hoechst Celanese Corp. of Chatham, N.J.). When being molded, all portions of the structure 10 lie in generally the same plane. It is also important that the structure 10 is molded flat (and then bent).

The structure 10 may also include a plastic webbing guide portion 40 attached to the base portion 12. The webbing guide portion 40 lies in a plane parallel to the plane in which the base portion 12 lies. The plastic webbing guide portion 40 is formed from the same homogeneous plastic material as the base portion 12. The plastic webbing guide portion 40 and the base portion 12 form an opening 41 (FIG. 1) between the webbing guide portion 40 and the base portion 12 for belt webbing to extend through.

The structure 10 is processed and formed in the manner described below to comprise at least a part of the retractor 11. First, the structure 10 is heated until the two hinge portions 18, 20 are each heated to a temperature of about 325° F. When the temperature of 325° F. is reached, the two side frame portions 22, 24 are bent about their respective hinge portions 18, 20 so that the base portion 12 and the two side frame portions 22, 24 form a generally U-shaped structure. After the two side frame portions 22, 24 are bent into their positions relative to the base portion 12 to form the U-shaped structure, the two hinge portions 18, 20 are allowed to cool. The hinge portions 18, 20 stiffen as they cool.

After the two hinge portions 18, 20 stiffen, a spool shaft 78 (shown in FIG. 1 only) and the spool 15 are rotatably mounted between the two side frame portions 22, 24 in a manner that is known. Specifically, the spool 15 is located between the two side frame portions 22, 24 so that the bore 82 through the spool 15 is aligned with the hole 21 in the side frame portion 22 and the hole 27 in the side frame portion 24. After the bore 82 through the spool 15 is aligned with the two holes 21, 27, one end of the spool shaft 78 is inserted into one of the holes 21, 27 and into the bore 82. The one end of the spool shaft 78 is then moved through the bore 82 and through the other one of the holes 21, 27. The spool 15 and the spool shaft 78 are thereby rotatably supported between the side frame portions 22, 24 for rotation in the belt winding and belt unwinding directions. Belt webbing 77 from the spool 15 is guided through the opening 41 formed between the base portion 12 and the webbing guide portion 40.

Figure 3:
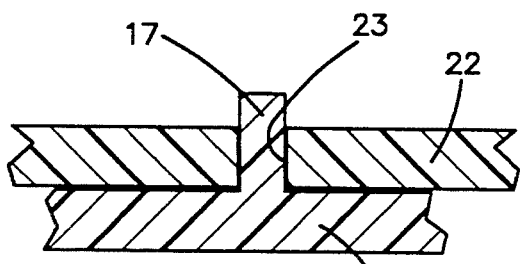
FIG. 3 is an enlarged detail view showing one portion of the structure of FIG. 2 inserted into another portion of the structure.

After the spool shaft 78 and the spool 15 are rotatably mounted between the side frame portions 22, 24, the spring 75 is operatively connected between one end of the spool shaft 78 and the spring cover 26 in a known manner to bias the spool 15 in the belt winding direction. The hinge portion 28 is then heated to a temperature of 325° F. to allow the hinge portion 28 to be bent and thereby to enable the spring cover 26 to be placed over the side frame portion 22. The spring cover 26 is placed over the side frame portion 22 so that the three pins 17 on the spring cover 26 are aligned with and extend through the three holes 23 in the side frame portion 22, as shown in FIG. 3. When the hinge portion 28 cools, the hinge portion 28 stiffens and holds the spring cover 26 and the side frame portion 22 together.

Figure 4:
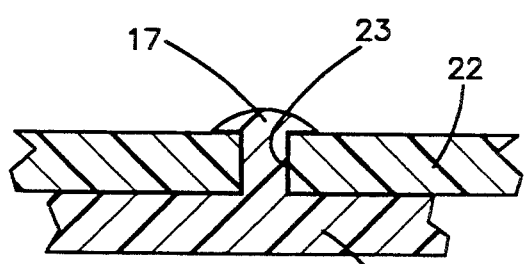
FIG. 4 is a view similar to the view of FIG. 3 but showing the portions of the structure in a different condition.

The tip of each of the three pins 17 is then heated to a temperature of about 185° F. and deformed, as shown in FIG. 4. The deformed pins 17 are then allowed to cool. After cooling, each of the deformed pins 17 functions as a fastener to hold the side frame portion 22 and the spring cover 26 securely together and thereby to enclose the spring 75. This process of heating and deforming is known as heat staking.

The sensor 76 is mounted to the side frame portion 24 in a known manner. The sensor 76 may be a vehicle deceleration sensor which provides an output upon sensing vehicle deceleration of at least a predetermined magnitude. Alternatively, the sensor 76 may be a webbing acceleration sensor which provides an output upon sensing acceleration of the belt webbing 77 in the belt unwinding direction of at least a predetermined amount.

After the sensor 76 is mounted to the side frame portion 24, the hinge portion 32 is heated to a temperature of 325° F. to allow the hinge portion 32 to be bent and thereby to enable the sensor cover 30 to be placed over the side frame portion 24. The sensor cover 30 is placed over the side frame portion 24 so that the four pins 31 on the sensor cover 30 are aligned with and extend through the four holes 25 in the side frame portion 24. When the hinge portion 32 cools, the hinge portion 32 stiffens and holds the sensor cover 30 and the side frame portion 24 together.

Like the three pins 17 on the spring cover 26, the tip of each of the four pins 31 on the sensor cover 30 is heated to a temperature of about 185° F. and deformed. The deformed pins 31 are then allowed to cool. After cooling, each of the pins 31 functions as a fastener to hold the side frame portion 24 and the sensor cover 30 securely together and thereby to enclose the sensor 76.

A locking pawl (not shown) having opposite end portions is operatively mounted between the side frame portions 22, 24 in a known manner. Specifically, one end portion of the locking pawl is received in the opening 45 in the side frame portion 22, and the opposite end portion of the locking pawl is received in the opening 47 in the side frame portion 24. The end portions of the locking pawl are supported by the surfaces defining the respective openings 45, 47. The locking pawl is supported for pivotal movement in response to the sensor 76 providing an output indicative of vehicle deceleration of at least the predetermined magnitude or webbing acceleration of at least the predetermined amount. The locking pawl is pivoted into engagement with the teeth of the ratchet wheel 80 on the spool 15 to block rotation of the spool 15 in the belt unwinding direction.

A second embodiment of the present invention is shown in FIG. 5. The embodiment illustrated in FIG. 5 is similar to the embodiment in FIG. 2. Referring to FIG. 5, a structure 110 comprises a stamped metal base portion 112, preferably of steel. The base portion 112 includes a main portion 113 located between opposite end portions 114, 116. A hinge area portion 118 of the base portion 112 interconnects the main portion 113 and the end portion 114. Similarly, a hinge area portion 120 of the base portion 112 interconnects the main portion 113 and the end portion 116.

The structure 110 further comprises a plastic side frame portion 122 into which the end portion 114 of the base portion 112 is insert molded. The end portion 114 has a centrally located hole. The end portion 114 also has two major side surfaces, both of which are covered by the plastic material of the plastic side frame portion 122. The plastic material on one major side surface of the end portion 114 may be interconnected through the hole with the plastic material on the other major side surface of the end portion 114. The plastic material extending through the hole in the end portion 114 defines a hole 121 having a diameter which is smaller than the diameter of the hole in the end portion 114. The side frame portion 122 has three holes 123 which are located in a triangular pattern adjacent three corners of the side frame portion 122. The side frame portion 122 also has an opening 145 located adjacent a fourth corner of the side frame portion 122, as shown in FIG. 5.

Similarly, the structure 110 comprises a plastic side frame portion 124 into which the end portion 116 of the base portion 112 is insert molded. The end portion 116 has a centrally located hole. The end portion 116 also has two major surfaces, both of which are covered by the plastic material of the plastic side frame portion 124. The plastic material on one major side surface of the end portion 116 may be interconnected through the hole with the plastic material on the other major side surface of the end portion 116. The plastic material extending through the hole in the end portion 116 defines a hole 127 having a diameter which is smaller than the diameter of the hole in the end portion 116. The side frame portion 124 has four holes 125 which are located in a generally trapezoidal pattern adjacent four corners of the side frame portion 124. The side frame portion 124 also has an opening 147 located adjacent one of the four holes 125, as shown in FIG. 5. Preferably, the side frame portions 122, 124 in the embodiment of FIG. 5 are made of nylon, such as NYLON 66 or NYLON 6 (trademarks, Hoechst Celanese Corp. of Chatham, N.J.).

The hinge area portion 118 enables the side frame portion 122 and the main portion 113 of the base portion 112 to pivot relative to each other and into position with the main portion 113 and the side frame portion 122 comprising at least a part of the frame of the retractor. Similarly, the hinge area portion 120 enables the side frame portion 124 and the main portion 113 of the base portion 112 to pivot relative to each other and into position with the side frame portion 124 and the main portion 113 of the base portion 112 comprising at least a part of the frame of the retractor.

A plastic hinge portion 128 interconnects the side frame portion 122 and a plastic portion 126 which comprises the spring cover. The spring cover 126 includes three pins 117 which project perpendicularly from the spring cover 126, into the page as viewed in FIG. 5. Similarly, a plastic hinge portion 132 interconnects the side frame portion 124 and a plastic portion 130 which comprises a cover for a vehicle deceleration and/or webbing acceleration sensor. The sensor cover 130 includes four pins 131 which project perpendicularly from the sensor cover 130, into the page as viewed in FIG. 5.

The structure 110 shown in FIG. 5 is processed and formed in a manner similar to the manner as described above with respect to the embodiment shown in FIG. 2 to form at least a part of a retractor. In the embodiment of FIG. 5, the hinge area portions 118, 120 of the base portion 112 are bent so that these portions form a U-shaped frame for a retractor, such as the frame 13 shown in FIG. 1.

A third embodiment of the present invention is illustrated in FIG. 6. Referring to FIG. 6, a structure 210 comprises a plastic base portion 212 having a generally U-shape and comprising the frame of the retractor. The U-shaped base portion 212 comprises a main portion 213 which interconnects a plastic side frame portion 222 and a plastic side frame portion 224.

The side frame portions 222, 224 comprise the legs of the U-shaped base portion 212. The side frame portion 222 has a centrally located hole 221 and three holes 223 which are located in a triangular pattern adjacent three corners of the side frame portion 222. The side frame portion 222 also has an opening 245 located adjacent a fourth corner of the side frame portion, as shown in FIG. 6. The side frame portion 224 has a centrally located hole 227 and four holes 225 which are located adjacent four corners of the side frame portion 224. The side frame portion 224 also has an opening 247 located near one of the four holes 225, as shown in FIG. 6.

A plastic tie bar portion 250 interconnects the side frame portions 222, 224 to support the side frame portions 222, 224. A U-shaped webbing guide portion 240 is connected to the main portion 213 of the base portion 212, as shown in FIG. 6. The U-shaped webbing guide portion 240 and the main portion 213 of the base portion 212 form an opening 241 through which belt webbing extends.

A plastic hinge portion 228 interconnects the side frame portion 222 and a plastic portion 226 which comprises the spring cover. The spring cover 226 includes three pins 217, as shown in FIG. 6. A plastic hinge portion 232 interconnects the side frame portion 224 and a plastic portion 230 which comprises a cover for a vehicle deceleration and/or webbing acceleration sensor. The sensor cover 230 includes four pins 231, as shown in FIG. 6. The two cover portions 226, 230, the two hinge portions 228, 232, the webbing guide portion 240, and the U-shaped base portion 212 including the main portion 213 and the side frame portions 222, 224 comprise a homogeneous plastic material. The homogeneous plastic material in the embodiment of FIG. 6 is made, for example, of a liquid crystal polymer called "VECTRA" (trademark, Hoechst Celanese Corp. of Chatham, N.J.).

The structure 210 shown in FIG. 6 is processed and formed in a manner similar to the manner as described above with respect to the embodiment shown in FIG. 2 to comprise at least a part of a retractor, except the side frame portions 222, 224 of the embodiment of FIG. 6 need not be bent relative to the main portion 213 to form a generally U-shaped structure since the side frame portions 222, 224 are already bent in position relative to the main portion 213 and are interconnected together by the tie bar portion 250. In the embodiment of FIG. 6, the main portion 213 and side frame portions 222, 224 are already molded in a U-shape to form the frame of the retractor, such as the frame 13 of the retractor 11 of FIG. 1. The tie bar portion 250 is also molded together with the side frame portions 222, 224 and the main portion 213.

Although the location of the plastic hinge portion 228 in the embodiment of FIG. 6 is different from the location of the plastic hinge portion 28 of FIG. 2, the heating and bending of the hinge portion 228 to place the spring cover 226 of FIG. 6 over the side frame portion 222 are the same as that described above for the hinge portion 28 in the embodiment of FIG. 2. The heating and bending of the hinge portion 232 to place the sensor cover 230 of FIG. 6 over the side frame portion 224 are the same as that described above for the hinge portion 32 in the embodiment of FIG. 2.

A fourth embodiment of the present invention is illustrated in FIG. 7. The embodiment illustrated in FIG. 7 is similar to the embodiment illustrated in FIG. 6. Referring to FIG. 7, a structure 310 comprises a stamped metal base portion 312, preferably of steel. The base portion 312 includes a main portion 313 interconnecting opposite end portions 314, 316.

The structure 310 further comprises a plastic side frame portion 322 into which the end portion 314 of the base portion 312 is insert molded, and a plastic side frame portion 324 into which the end portion 316 of the base portion 312 is insert molded. The end portion 314 has a centrally located hole. The end portion 314 also has two major side surfaces, both of which are covered by the plastic material of the plastic side frame portion 322. The plastic material on one major side surface of the end portion 314 may be interconnected through the hole with the plastic material on the other major side surface of the end portion 314. The plastic material extending through the hole in the end portion 314 forms a hole 321 having a diameter which is smaller than the diameter of the hole in the end portion 314. The metal base portion 312 and the two plastic side frame portions 322, 324 comprise at least a part of a frame of a retractor. The side frame portion 322 has three holes 323 which are located in a triangular pattern adjacent three corners of the side frame portion 322. The side frame portion 322 also has an opening 345 located adjacent a fourth corner of the side frame portion 322, as shown in FIG. 7.

Similarly, the structure 310 comprises a plastic side frame portion 324 into which the end portion 316 of the base portion 312 is insert molded. The end portion 316 has a centrally located hole. The end portion 316 has two major side surfaces, both of which are covered by the plastic material of the plastic side frame portion 324. The plastic material on one major side surface of the end portion 316 may be interconnected through the hole with the plastic material on the other major side surface of the end portion 316. The plastic material extending through the hole in the end portion 316 forms a hole 327 having a diameter which is smaller than the diameter of the hole in the end portion 316. The side frame portion 324 has four holes 325 which are located in a generally trapezoidal pattern adjacent four corners of the side frame portion 324. The side frame portion 324 also has an opening 347 located adjacent one of the four holes 325, as shown in FIG. 7. Preferably, the side frame portions 322, 324 in the embodiment of FIG. 7 are made of nylon, such as NYLON 66 or NYLON 6 (trademarks, Hoechst Celanese Corp. of Chatham, N.J.).

A plastic tie bar portion 350 interconnects the side frame portion 322 and the side frame portion 324. A U-shaped webbing guide portion 340 is connected to the main portion 313 of the base portion 312, as shown in FIG. 7. The U-shaped webbing guide portion 340 and the main portion 313 of the base portion 312 form an opening 341 through which belt webbing extends.

A plastic hinge portion 328 interconnects the side frame portion 322 and a plastic portion 326 which comprises the spring cover. The spring cover 226 includes three pins 317, as shown in FIG. 7. A plastic hinge portion 332 interconnects the side frame portion 324 and a plastic portion 330 which comprises a cover for a vehicle deceleration and/or webbing acceleration sensor. The sensor cover 330 includes four pins 331, as shown in FIG. 7. The two cover portions 326, 330, the two hinge portions 328, 332, the two side frame portions 322, 324, the webbing guide portion 340, and the tie bar portion 350 comprise a homogeneous plastic material. Preferably, the homogeneous plastic material in the embodiment of FIG. 7 is made of nylon, such as NYLON 66 or NYLON 6 (trademarks, Hoechst Celanese Corp. of Chatham, N.J.).

The structure 310 shown in FIG. 7 is processed and formed in a manner similar to the manner as described above with respect to the embodiment shown in FIG. 6 to form at least a part of a retractor. In the embodiment of FIG. 7, the main portion 313 and the side frame portions 322, 324 are already in a generally U-shape to form the frame of a retractor, such as the frame 13 of the retractor 11 of FIG. 1. The tie bar portion 350 is molded together with the side frame portions 322, 324.

It is contemplated that the base portion of the present invention illustrated in FIGS. 6 and 7 may be constructed of material other than steel. As an example (not shown), the base may comprise strips of belt webbing which are insert molded into the two side frame portions which comprise the legs of the U-shaped frame of the retractor.

A number of advantages result by providing a structure constructed in accordance with the present invention. One advantage is that the number of separate parts required to form the retractor is reduced. This reduces the inventory of parts required to form the retractor. Another advantage is that the use of plastic material results in substantial reductions in weight of the retractor. Also, with specific regard to the embodiment of FIG. 6, the alignment of the holes 221, 227 in the side frame portions 222, 224, respectively, is improved. The alignment of the holes 221, 227 is improved because the side frame portions 222, 224 and the base portion 212 are already molded in a U-shape.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. A structure for use in a seat belt retractor having a frame, a spool supported in the frame and rotatable in belt winding and unwinding directions, a spring member biasing the spool in the belt winding direction, and a sensor member, said structure comprising:
   a first plastic portion comprising at least a part of the frame of the retractor;
   a second plastic portion comprising a cover for one of the members; and
   a first plastic hinge portion interconnecting said first and second plastic portions for enabling said first and second plastic portions to pivot relative to each other and into position with said second plastic portion covering said one of the members.

2. A structure according to claim 1 wherein said first plastic hinge portion and said first and second plastic portions comprise a homogeneous plastic material.

3. A structure according to claim 1 further including a third plastic portion comprising at least another part of the frame of the retractor.

4. A structure according to claim 3 further including a second plastic hinge portion interconnecting said first and third plastic portions for enabling said first and third plastic portions to pivot relative to each other.

5. A structure according to claim 4 further including a fourth plastic portion comprising a further part of the frame of the retractor.

6. A structure according to claim 5 further including a third plastic hinge portion interconnecting said third and fourth plastic portions for enabling said third and fourth plastic portions to pivot relative to each other.

7. A structure according to claim 6 further including a fifth plastic portion comprising a cover for the other one of said members.

8. A structure according to claim 7 further including a fourth plastic hinge portion interconnecting said fourth and fifth plastic portions for enabling said fourth and fifth plastic portions to pivot relative to each other.

9. A structure according to claim 8 wherein said first, second, third, and fourth plastic hinge portions and said first, second, third, fourth, and fifth plastic portions comprise a homogeneous plastic material.

10. A structure according to claim 1 wherein said first and second plastic portions include means for securing said first and second plastic portions together with said second plastic portion covering said one of the members.

11. A structure for use in a seat belt retractor having a frame, a spool supported in the frame and rotatable in belt winding and unwinding directions, a spring member biasing the spool in the belt winding direction, and a spring cover attachable to the frame for enclosing the spring member, said structure comprising:
   a first plastic portion to which the spring cover is attachable to enclose the spring and on which the spool is supportable to rotate in the belt winding and unwinding directions; and
   a metal portion having an edge insert molded into said first plastic portion, said metal portion including means for enabling said metal portion to be bent into position with said first plastic portion and said metal portion comprising at least a part of the frame of the retractor.

12. A structure according to claim 11 further including a second plastic portion comprising the spring cover.

13. A structure according to claim 12 further including a plastic hinge portion interconnecting said first and second plastic portions to pivot relative to each other.

14. A structure for use in a seat belt retractor having a frame, a spool supported in the frame and rotatable in belt winding and unwinding directions, a spring member biasing the spool in the belt winding direction, and a spring cover attachable to the frame for enclosing the spring member, said structure comprising:
   a first plastic portion having a generally U-shape and comprising at least a part of the frame of the retractor;
   a second plastic portion comprising the spring cover; and a first plastic hinge portion interconnecting said first and second plastic portions for enabling said first and second plastic portions to pivot relative to each other.

15. A structure according to claim 14 wherein said first plastic hinge portion and said first and second plastic portions comprise a homogeneous plastic material.

16. A structure according to claim 14 further including a third plastic portion comprising a sensor cover and a second plastic hinge portion interconnecting said first and third plastic portions for enabling said first and third plastic portions to pivot relative to each other.

17. A structure according to claim 16 wherein said first and second plastic hinge portions and said first, second, and third plastic portions comprise a homogeneous plastic material.

18. A structure according to claim 14 further including a plastic tie bar portion interconnecting the legs of said U-shaped first plastic portion for supporting said U-shaped first plastic portion.

19. A structure according to claim 18 wherein said first plastic hinge portion, said plastic tie bar portion, and said first and second plastic portions comprise a homogeneous plastic material.

20. A structure for use in a seat belt retractor having a frame, a spool supported in the frame and rotatable in belt winding and unwinding directions, a spring member biasing the spool in the belt winding direction, and a spring cover attachable to the frame for enclosing the spring member, said structure comprising:
   a first plastic portion and a second plastic portion to which the spring cover is attachable to enclose the spring and on which the spool is supportable to rotate in the belt winding and unwinding directions;
   a metal portion insert molded into said first and second plastic portions and interconnecting said first and second plastic portions to form a generally U-shape and to comprise at least a part of the frame of the retractor;
   a plastic tie bar portion located opposite said metal portion and interconnecting said first and second plastic portions to support said first and second plastic portions, said plastic tie bar portion and said first and second plastic portions comprising a homogeneous plastic material;
   said structure further including a third plastic portion comprising the spring cover; and
   a plastic hinge portion interconnecting said second and third plastic portions for enabling said second and third plastic portions to pivot relative to each other.

21. A structure according to claim 20 wherein said plastic hinge portion, said plastic tie bar portion, and said first, second, and third plastic portions comprise a homogeneous plastic material.

22. A structure for use in a seat belt retractor having a frame, a spool supported in the frame and rotatable in belt winding and unwinding directions, a spring member biasing the spool in the belt winding direction, and a spring cover attachable to the frame for enclosing the spring member, said structure comprising:
   a first plastic portion and a second plastic portion to which the spring cover is attachable to enclose the spring and on which the spool is supportable to rotate in the belt winding and unwinding directions;
   a metal portion insert molded into said first and second plastic portions and interconnecting said first and second plastic portions to form a generally U-shape and to comprise at least a part of the frame of the retractor; and
   a plastic tie bar portion located opposite said metal portion and interconnecting said first and second plastic portions to support said first and second plastic portions, said plastic tie bar portion and said first and second plastic portions comprising a homogeneous plastic material.

23. A structure according to claim 22 further including a third plastic portion comprising the spring cover.

24. A structure for use in a seat belt retractor having a frame, a spool supported in the frame and rotatable in belt winding and unwinding directions, a spring member biasing the spool in the belt winding direction, and a cover attached to the frame for enclosing the spring member, said structure comprising:
   a homogeneous plastic material having at least first and second portions and first hinge means for hingedly interconnecting said first and second portions for enabling said first and second portions to pivot relative to each other and into position with said first and second portions comprising at least a part of the frame of the retractor;
   said homogeneous plastic material having a third portion comprising the spring cover; and
   said homogeneous plastic material having second hinge means for hingedly connecting said third portion to one of said first and second portions of said homogeneous plastic material for enabling said portions to pivot relative to each other and into position with said third portion and said one of said first and second portions enclosing the spring member.

25. A method of making at least a part of a seat belt retractor having a frame, a spool supported in the frame and rotatable in belt winding and unwinding directions, a spring member biasing the spool in the belt winding direction, and a sensor member, said method comprising the steps of:
   providing a structure having a first plastic portion for comprising at least a part of the frame of the retractor, a second plastic portion for comprising a cover for one of the members, and a first plastic hinge portion interconnecting the first and second plastic portions;
   providing a frame including the step of moving the first plastic portion into a position to comprise at least a part of the frame of the retractor;
   mounting the spool in the frame of the retractor to support the spool for rotation in belt winding and unwinding directions;
   operatively connecting the spring member to the spool to bias the spool in the belt winding direction;
   mounting the sensor member on the frame of the retractor; and
   pivoting the first and second plastic portions relative to each other and into a position with the second plastic portion covering the one of the members.

26. A method according to claim 25 wherein the step of providing a frame includes the steps of providing a third plastic portion, and moving the third plastic portion into a position to comprise at least another part of the frame of the retractor.

27. A method according to claim 26 further comprising the steps of providing a fourth plastic portion to comprise a cover for the other one of the members, and pivoting the third and fourth plastic portions relative to each other and into a position with the fourth plastic portion covering the other one of the members.

28. A method according to claim 25 further comprising the step of heating the first plastic hinge portion to a temperature of 325° F. to allow the first and second plastic portions to be pivoted relative to each other and into the position with the second plastic portion covering the one of the members.

29. A method according to claim 25 further comprising the steps of (i) providing a number of heatable and deformable pins between the first and second plastic portions, (ii) heating the pins to a temperature of 185° F., (iii) deforming the heated pins into a position to secure the first and second plastic portions together, and (iv) allowing the deformed pins to cool and thereby to stiffen.

30. A method of making at least a part of a seat belt retractor having a frame, a spool supported in the frame and rotatable in belt winding and unwinding directions, a spring member biasing the spool in the belt winding direction, and a spring cover attachable to the frame for enclosing the spring member, said method comprising the steps of:
providing a structure having (i) a first plastic portion to which the spring cover is attachable to enclose the spring and on which the spool is supportable to rotate in the belt winding and unwinding directions, and (ii) a metal portion insert molded into the first plastic portion and for comprising at least a part of the frame; and
bending the metal portion relative to the first plastic portion and into position with the first plastic portion and the metal portion comprising at least a part of the frame of the retractor.

31. A method according to claim 30 further comprising the step of providing a second plastic portion connected to the first plastic portion and comprising the spring cover.

32. A method according to claim 31 further comprising the steps of operatively connecting the spring member to the spool to bias the spool in the belt winding direction, and pivoting the first and second plastic portions relative to each other to cover the spring member with the second plastic portion.

33. A method of making at least a part of a seat belt retractor having a frame, a spool supported in the frame and rotatable in belt winding and unwinding directions, a spring member biasing the spool in the belt winding direction, and a spring cover attachable to the frame for enclosing the spring member, said method comprising the steps of:
providing a generally U-shaped first plastic portion for comprising at least a part of the frame of the retractor, a second plastic portion for comprising the spring cover, and a first plastic hinge portion interconnecting the first and second plastic portions;
mounting the spool between the legs of the generally U-shaped first plastic portion to support the spool for rotation in belt winding and unwinding directions;
operatively connecting the spring member to the spool to bias the spool in the belt winding direction; and pivoting the first and second plastic portions relative to each other and into a position with the second plastic portion covering the spring member.

34. A method according to claim 33 further comprising the steps of providing a third plastic portion connected with the first plastic portion and comprising a sensor cover for a sensor, and pivoting the first and third plastic portions relative to each other and into a position with the third plastic portion covering the sensor.

35. A method according to claim 33 further comprising the step of providing a plastic tie bar portion interconnecting the legs of the generally U-shaped first plastic portion to support the U-shaped first plastic portion.

36. A method for making at least part of a seat belt retractor having a frame, a spool supported in the frame and rotatable in belt winding and unwinding directions, a spring member biasing the spool in the belt winding direction, and a spring cover attachable to the frame for enclosing the spring member, said method comprising the steps of:
providing a structure having (i) a first plastic portion comprising at least a part of the frame, (ii) a second plastic portion comprising at least a part of the frame and to which the spring cover is attachable to enclose the spring and on which the spool is supportable to rotate in the belt winding and unwinding directions, (iii) a metal portion insert molded into the first and second plastic portions and interconnecting the first and second plastic portions to form a generally U-shape and to comprise at least a part of the frame, and (iv) a plastic tie bar portion located opposite the metal portion and interconnecting the first and second plastic portions to support the first and second plastic portions;
mounting the spool between the legs of the generally U-shaped structure to support the spool for rotation in belt winding and unwinding directions;
operatively connecting the spring member to the spool to bias the spool in the belt winding direction;
further comprising the steps of providing a third plastic portion connected to the second plastic portion and comprising the spring cover, and pivoting the second and third plastic portions relative to each other and into a position with the third plastic portion covering the spring member.

37. A method for making at least part of a seat belt retractor having a frame, a spool supported in the frame and rotatable in belt winding and unwinding directions, a spring member biasing the spool in the belt winding direction, and a spring cover attachable to the frame for enclosing the spring member, said method comprising the steps of:
providing a structure having (i) a first plastic portion comprising at least a part of the frame, (ii) a second plastic portion comprising at least a part of the frame and to which the spring cover is attachable to enclose the spring and on which the spool is supportable to rotate in the belt winding and unwinding directions, (iii) a stamped metal portion insert molded into the first and second plastic portions and interconnecting the first and second plastic portions to form a generally U-shape and to comprise at least a part of the frame, and (iv) a plastic tie bar portion located opposite the metal portion and interconnecting the first and second plastic portions to support the first and second plastic portions;

mounting the spool between the legs of the generally U-shaped structure to support the spool for rotation in belt winding and unwinding directions; and operatively connecting the spring member to the spool to bias the spool in the belt winding direction.

38. A structure for use in a seat belt retractor having a frame, a spool supported in the frame and rotatable in belt winding and unwinding directions, a spring member biasing the spool in the belt winding direction, and a spring cover attachable to the frame for enclosing the spring member, said structure comprising:

a first plastic portion and a second plastic portion to which the spring cover is attachable to enclose the spring and on which the spool is supportable to rotate in the belt winding and unwinding directions;

a stamped metal portion insert molded into said first and second plastic portions and interconnecting said first and second plastic portions to form a generally U-shape and to comprise at least a part of the frame of the retractor; and a plastic tie bar portion located opposite said metal portion and interconnecting said first and second plastic portions to support said first and second plastic portions, said plastic tie bar portion and said first and second plastic portions comprising a homogeneous plastic material.

39. A structure according to claim 38 further including a third plastic portion comprising the spring cover.

40. A structure according to claim 39 further including a plastic hinge portion interconnecting said second and third plastic portions for enabling said second and third plastic portions to pivot relative to each other.

41. A structure according to claim 40 wherein said plastic hinge portion, said plastic tie bar portion, and said first, second, and third plastic portions comprise a homogeneous plastic material.

42. A method for making at least part of a seat belt retractor having a frame, a spool supported in the frame and rotatable in belt winding and unwinding directions, a spring member biasing the spool in the belt winding direction, and a spring cover attachable to the frame for enclosing the spring member, said method comprising the steps of:

providing a structure having (i) a first plastic portion comprising at least a part of the frame, (ii) a second plastic portion comprising at least a part of the frame and to which the spring cover is attachable to enclose the spring and on which the spool is supportable to rotate in the belt winding and unwinding directions, (iii) a stamped metal portion insert molded into the first and second plastic portions and interconnecting the first and second plastic portions to form a generally U-shape and to comprise at least a part of the frame, and (iv) a plastic tie bar portion located opposite the metal portion and interconnecting the first and second plastic portions to support the first and second plastic portions;

mounting the spool between the legs of the generally U-shaped structure to support the spool for rotation in belt winding and unwinding directions; and operatively connecting the spring member to the spool to bias the spool in the belt winding direction.

43. A method according to claim 42 further comprising the steps of providing a third plastic portion connected to the second plastic portion and comprising the spring cover, and pivoting the second and third plastic portions relative to each other and into a position with the third plastic portion covering the spring member.

* * * * *